United States Patent
Chang

(10) Patent No.: US 10,333,571 B1
(45) Date of Patent: Jun. 25, 2019

(54) SIGNAL RECEIVING APPARATUS WITH DESKEW CIRCUIT

(71) Applicant: Novatek Microelectronics Corp., Hsinchu (TW)

(72) Inventor: Chun-Chi Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/028,427

(22) Filed: Jul. 6, 2018

(51) Int. Cl.
    *H04B 1/16* (2006.01)
    *H04L 7/00* (2006.01)
    *H04L 7/033* (2006.01)

(52) U.S. Cl.
    CPC ......... *H04B 1/1607* (2013.01); *H04L 7/0016* (2013.01); *H04L 7/0079* (2013.01); *H04L 7/0331* (2013.01)

(58) Field of Classification Search
    CPC ... H04B 1/1607; H04L 7/0016; H04L 7/0079; H04L 7/0331
    USPC ......................................................... 375/375
    See application file for complete search history.

(56) References Cited

U.S. PATENT DOCUMENTS

2015/0192949 A1* 7/2015 Wu ................. H04L 7/0004 713/503

\* cited by examiner

*Primary Examiner* — Michael R Neff
(74) *Attorney, Agent, or Firm* — JCIPRNET

(57) ABSTRACT

A signal receiving apparatus includes a clock and data recovery (CDR) circuit, a first sampler, and at least one deskew circuit. The CDR circuit receives a first signal through a first lane of the signal receiving apparatus and decodes the first signal to extract a first clock signal from the first signal. The CDR circuit provides the first clock signal to the first sampler and the least one deskew circuit. The first sampler receives the first signal through the first lane of the signal receiving apparatus. The first sampler samples the first signal based on the first clock signal to generate a first output signal. The at least one deskew circuit receives a second signal through at least one second lane of the signal receiving apparatus and adjusts a phase skew between the first clock signal and the second signal so as to generate a second output signal.

12 Claims, 10 Drawing Sheets

FIG. 1 (RELATED ART)    100

SIGNAL RECEIVING APPARATUS WITH DESKEW CIRCUIT

BACKGROUND

Technical Field

The disclosure relates to a signal receiving apparatus, and more particularly, to a signal receiving apparatus including a deskew circuit.

Description of Related Art

With the increasing demand for high speed data transmission, many communication systems have employed multi-lane architecture to achieve a greater throughput. As for a multi-lane transmission system, a phase skew from one lane to another may become particularly significant. Moreover, when a data stream with an embedded clock signal is transmitted by the multi-lane transmission system, the clock signal must be regenerated at a receiver. Thus, in a conventional multi-lane receiver of the multi-lane transmission system, each reception lane requires a clock and data recovery (CDR) circuit to extract the clock signal from the transmitted data stream and eliminate the effect of phase skew. However, the CDR circuit typically consumes a lot of power, especially when multiple CDR circuits are disposed in a receiver.

For example, FIG. 1 is a block diagram of a conventional multi-lane receiver. As shown in FIG. 1, the receiver 100 includes N lanes 101-1, 101-2, ... 101-N to receive the input signals $R_{i1}$, $R_{i2}$, ... $R_{iN}$, respectively, wherein N is the positive integer. An equalizer (EQ), a CDR circuit, and a sampler are disposed in each of the N lanes 101-1, 101-2, ... 101-N to respectively generate the output signals $S_1$, $S_2$, ... $S_N$ (i.e. the recovered signals). For example, the first equalizer 110-1, the first CDR circuit 111-1, and the first sampler 112-1 are disposed in the first lane 101-1. The second equalizer 110-2, the second CDR circuit 111-2, and the second sampler 112-2 are disposed in the second lane 101-2. The Nth equalizer 110-N, the Nth CDR circuit 111-N, and the Nth sampler 112-N are disposed in the Nth lane 101-N.

Generally, timing information is embedded in a data stream (e.g., each of the input signals $R_{i1}$~$R_{iN}$) and is transmitted along with the data stream to the receiver 100. Accordingly, the receiver 100 requires multiple CDR circuits (e.g., CDR circuits 111-1~111-N) to extract the timing information from the input signals $R_{i1}$, $R_{i2}$, ... $R_{iN}$. Since a CDR circuit typically consume a lot of power, the power consumption of the receiver 100 may become particularly significant.

Therefore, how to reduce the power consumption of a signal receiving apparatus has become a critical issue.

SUMMARY

The disclosure provides a multi-lane signal receiving apparatus with low power design.

In an embodiment of the disclosure, a signal receiving apparatus including a clock and data recovery (CDR) circuit, a first sampler, and at least one deskew circuit is provided. The CDR circuit receives a first signal through a first lane of the signal receiving apparatus and decodes the first signal to extract a first clock signal from the first signal. The first sampler receives the first clock signal from the CDR circuit and receives the first signal through the first lane of the signal receiving apparatus. The first sampler samples the first signal according to the first clock signal so as to generate a first output signal. The at least one deskew circuit receives the first clock signal from the CDR circuit and receives a second signal through at least one second lane of the signal receiving apparatus. The at least one deskew circuit adjusts a phase skew between the first clock signal and the second signal so as to generate a second output signal. The at least one deskew circuit includes a skew adjusting circuit and a second sampler coupled to the skew adjusting circuit. The skew adjusting circuit detects the phase skew based on the first clock signal to generate a phase adjusting signal. The second sampler generates the second output signal according to the phase adjusting signal.

In an embodiment of the disclosure, a signal receiving apparatus including a first receiver and at least one deskew circuit is provided. The first receiver receives a first clock signal through a first lane of the signal receiving apparatus. The at least one deskew circuit receives a first data signal through at least one second lane of the signal receiving apparatus and adjusts a phase skew between the first clock signal and the first data signal so as to generate a first output signal. The at least one deskew circuit includes a skew adjusting circuit and a first sampler coupled to the skew adjusting circuit. The skew adjusting circuit detects the phase skew based on the first clock signal to generate a phase adjusting signal. The first sampler generates the first output signal according to the phase adjusting signal.

As mentioned above, in the embodiments of the disclosure, the first clock signal is acquired from the first lane of the signal receiving apparatus, and the at least one deskew circuit is disposed in the at least one second lane of the signal receiving apparatus (i.e., one deskew circuit per second lane). Based on the first clock signal, the deskew circuit can adjust a phase skew between one input signal received from the first lane and another input signal received from the at least one second lane. Hence, the signal receiving apparatus does not need to dispose multiple CDR circuit (e.g., one CDR circuit per lane). Therefore, the signal receiving apparatus of the disclosure can consume much lower power.

To make the above features and advantages of the disclosure more comprehensible, embodiments accompanied with drawings are described in detail below.

BRIEF DESCRIPTION OF THE DRAWINGS

The accompanying drawings are included to provide a further understanding of the disclosure, which are incorporated in and constitute a part of this specification. The drawings illustrate embodiments of the disclosure and, together with the description, serve to explain the principles of the disclosure.

DESCRIPTION OF EMBODIMENTS

Figure 1:
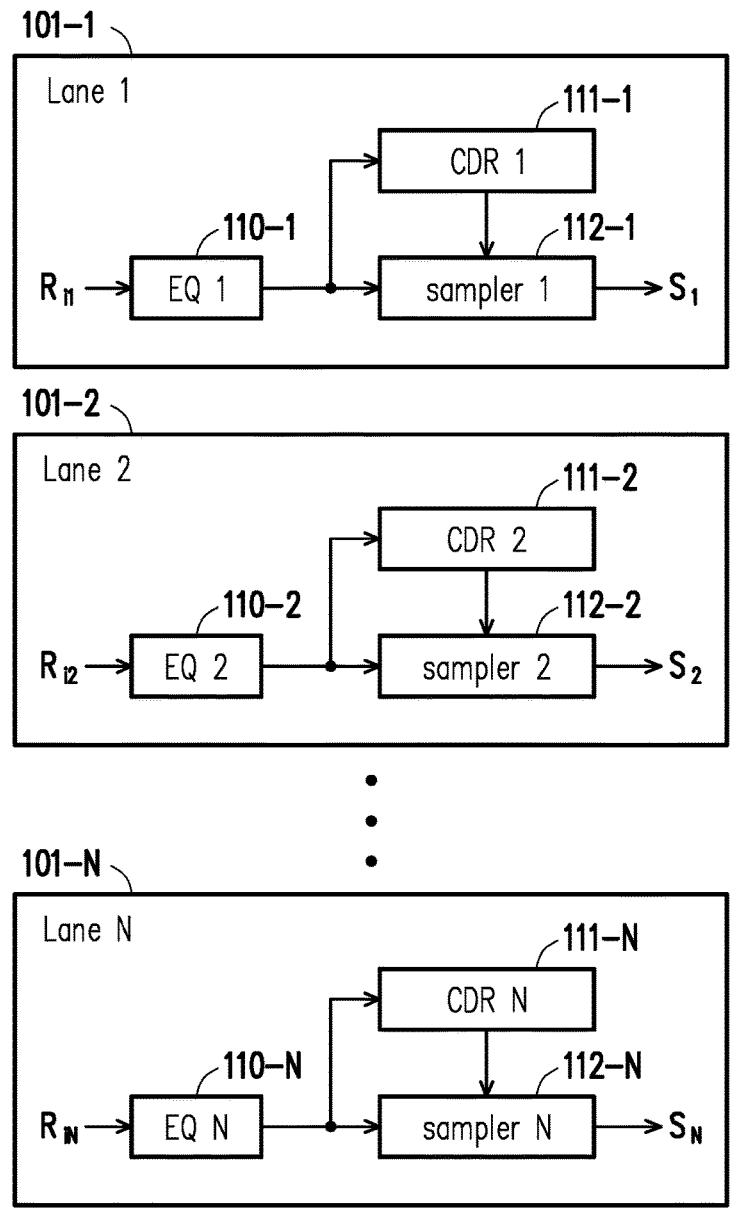
FIG. 1 is a block diagram of a conventional multi-lane receiver.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/steps with the same reference numerals or symbols in different embodiments may be mutually referenced to the related description.

Figure 2:
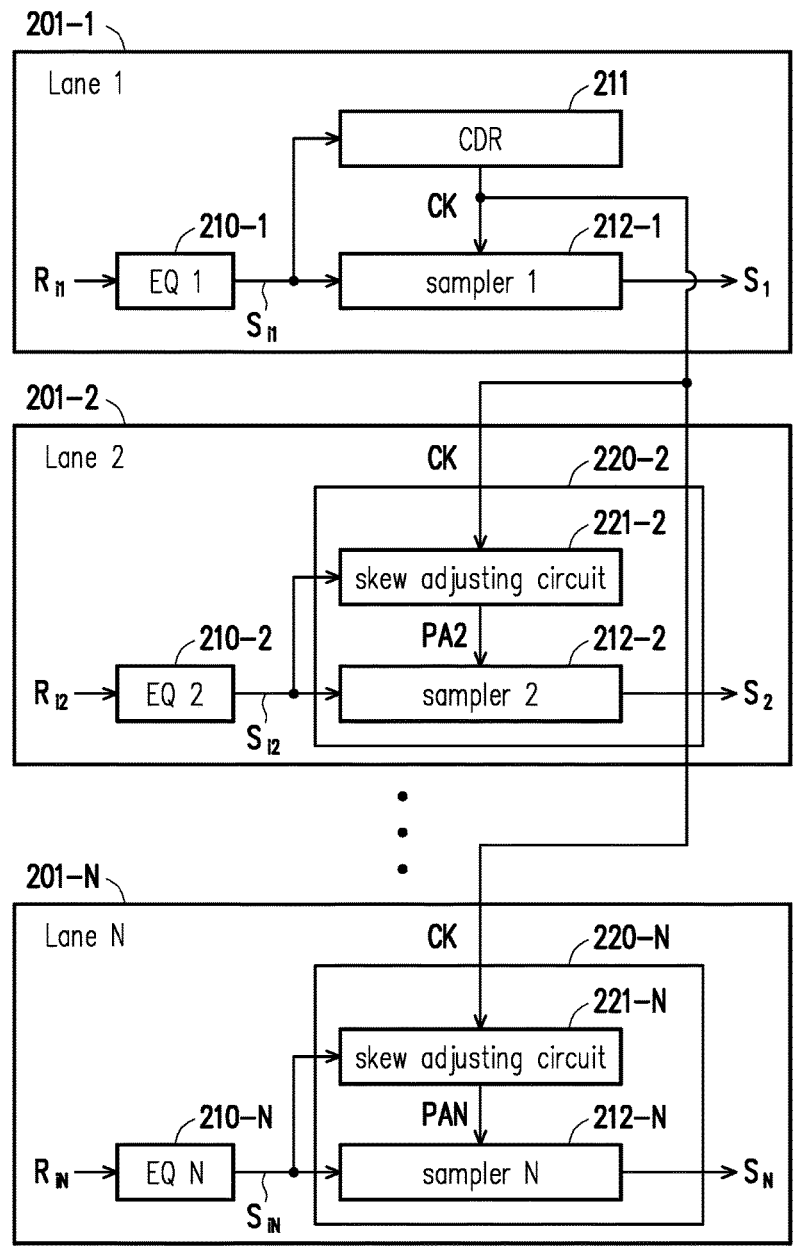
FIG. 2 is a block diagram of a signal receiving apparatus illustrating a clock deskew operation according to an embodiment of the disclosure.

FIG. 2 is a block diagram of a signal receiving apparatus 200 illustrating a clock deskew operation according to an embodiment of the disclosure. In the embodiment of FIG. 2, the signal receiving apparatus 200 includes N lanes 201-1, 201-2, . . . 201-N. Each of the second lane 201-2 to the Nth lane 201-N includes a deskew circuit (e.g., deskew circuits 220-2~220-N in FIG. 2) to perform the clock deskew operation.

Referring to FIG. 2, a first equalizer 210-1, a CDR circuit 211, and a first sampler 212-1 are disposed in the first lane 201-1. A second equalizer 210-2 and a deskew circuit 220-2 are disposed in the second lane 201-2. An Nth equalizer 210-N and a deskew circuit 220-N are disposed in the Nth lane 201-N. The first equalizer 210-1 to the Nth equalizer 210-N may respectively equalize the input signals $R_{i1}$~$R_{iN}$ so as to generate the signals $S_{i1}$~$S_{iN}$. For example, the first equalizer 210-1 to the Nth equalizer 210-N may shape waveforms of the input signals $R_{i1}$~$R_{iN}$ to compensate for attenuation of high-frequency signal components. In some embodiments, each of the input signals $R_{i1}$~$R_{iN}$ may include a pair of differential signals to reduce noise effects.

The CDR circuit 211 is coupled to the first sampler 212-1 and the deskew circuit 220-2 of the second lane 201-2. The CDR circuit 211 receives the first signal $S_{i1}$ from the first equalizer 210-1 and decodes the first signal So to extract the first clock signal CK from the first signal $S_{i1}$. When the CDR circuit 211 acquires the first clock signal CK, the CDR circuit 211 may provide the first clock signal CK to the first sampler 212-1 and each of the deskew circuit 220-2~220-N. The first sampler 212-1 also receives the first signal $S_{i1}$ from the first equalizer 210-1. The first sampler 212-1 utilizes the first clock signal CK to sample the first signal $S_{i1}$ so as to generate a first output signal $S_1$.

The deskew circuit 220-2 receives the second signal $S_{i2}$ from the second equalizer 210-2 and adjusts a phase skew between the first clock signal CK and the second signal $S_{i2}$ so as to generate a second output signal $S_2$. For example, the deskew circuit 220-2 includes a skew adjusting circuit 221-2 and a second sampler 212-2 coupled to the skew adjusting circuit 221-2. The skew adjusting circuit 221-2 detects the phase skew based on the first clock signal CK to generate a phase adjusting signal PA2. The second sampler 212-2 generates the second output signal $S_2$ according to the phase adjusting signal PA2.

Similarly, the deskew circuit 220-N receives the Nth signal $S_{iN}$ from the Nth equalizer 210-N and adjusts a phase skew between the first clock signal CK and the Nth signal $S_{iN}$ so as to generate an Nth output signal $S_N$. For example, the deskew circuit 220-N includes a skew adjusting circuit 221-N and an Nth sampler 212-N coupled to the skew adjusting circuit 221-N. The skew adjusting circuit 221-N detects the phase skew based on the first clock signal CK to generate a phase adjusting signal PAN. The Nth sampler 212-N generates the Nth output signal $S_N$ according to the phase adjusting signal PAN.

Figure 3A:
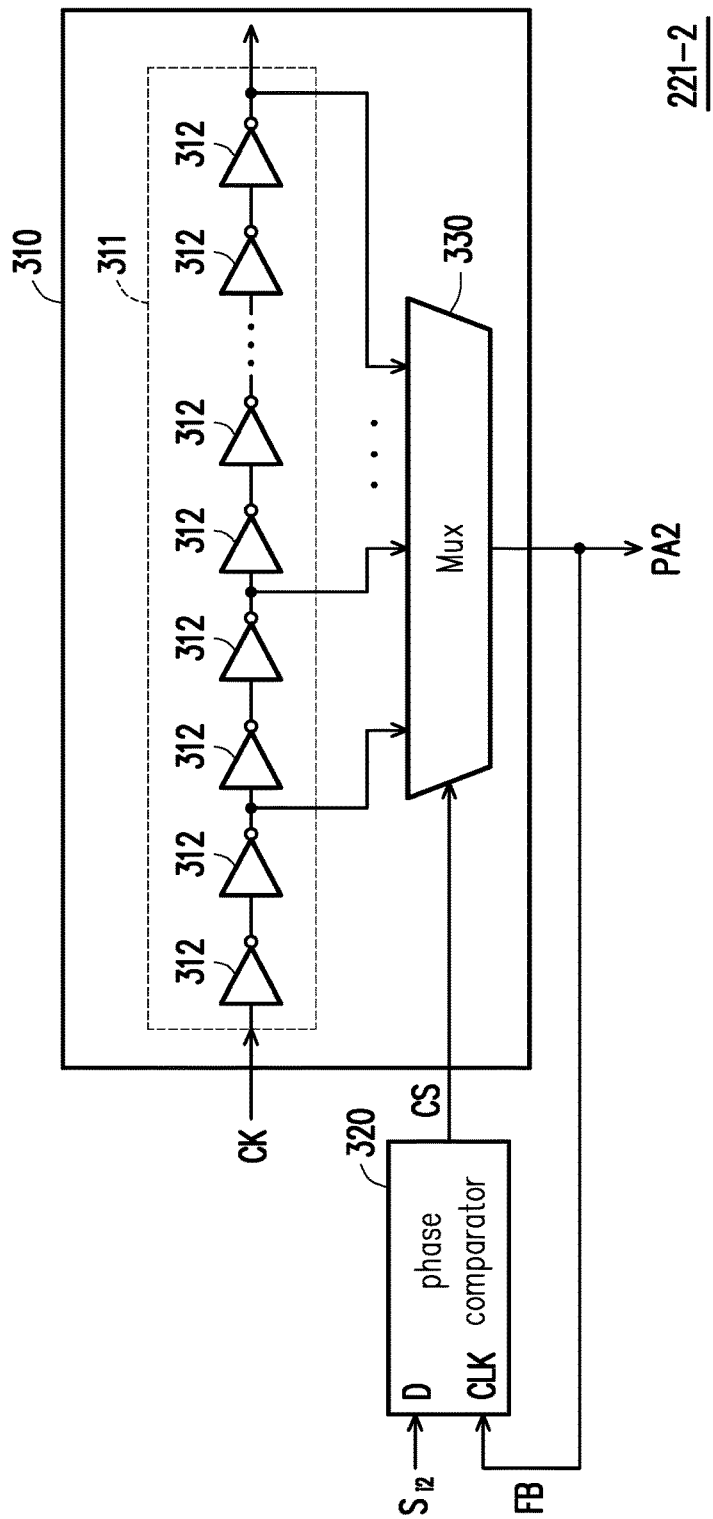
FIG. 3A is a block diagram of the skew adjusting circuit depicted in FIG. 2 according to an embodiment of the disclosure

FIG. 3A is a block diagram of the skew adjusting circuit 221-2 depicted in FIG. 2 according to an embodiment of the disclosure. As shown in FIG. 3A, the skew adjusting circuit 221-2 includes a phase comparator 320 and a phase adjusting circuit 310. The phase adjusting circuit 310 includes a clock phase generator 311 and a multiplexer (Mux) 330 coupled to the clock phase generator 311. The clock phase generator 311 may include a plurality of serially connected inverters 312. When clock phase generator 311 receives the first clock signal CK, the clock phase generator 311 may generate a plurality of clock signals with different phases according to the first clock signal CK. The multiplexer 330 may select one of the plurality of clock signals as a feedback signal FB and transmit the feedback signal FB to the phase comparator 320.

The phase comparator 320 generates a comparison signal CS according to the feedback signal FB and the second signal $S_{i2}$. The multiplexer 330 receives the comparison signal CS and generates a phase adjusting signal PA2 according to the comparison signal CS. For example, in the beginning, the multiplexer 330 may randomly select one clock signal from output clock signals of the clock phase generator 311 as the feedback signal FB. Then, the phase comparator 320 compares the feedback signal FB and the second signal $S_{i2}$ to generate the comparison signal CS. After several feedback cycles, a clock signal with a desired phase can be selected by the multiplexer 330 as a final output signal (e.g. phase adjusting signal PA2) to the second sampler 212-2.

For example, the phase comparator 320 may compare the feedback signal FB and the second signal $S_{i2}$ to generate a comparison result as the comparison signal CS. It is assumed that the comparison result shows a phase difference of 30 degrees between the first clock signal CK and the second signal $S_{i2}$. The multiplexer 330 may select one clock signal with a phase of 30 degrees from the clock signals generated by the clock phase generator 311 as the phase adjusting signal PA2. Therefore, the second sampler 212-2 can utilize the phase adjusting signal PA2 to sample the second signal $S_{i2}$ so as to generate the second output signal $S_2$.

Figure 3B:
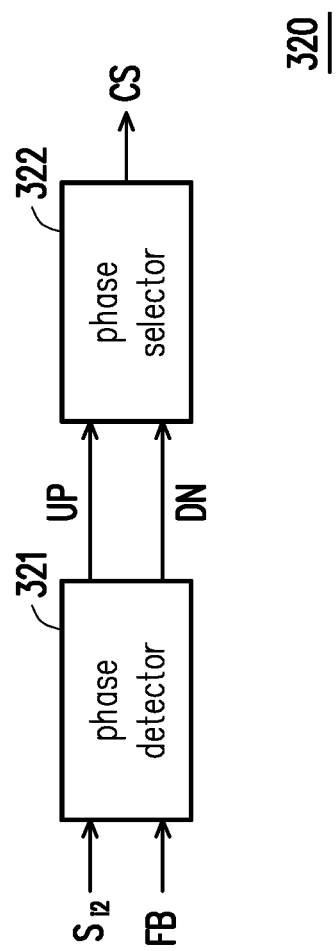
FIG. 3B is a block diagram of the phase comparator depicted in FIG. 3A according to an embodiment of the disclosure.

FIG. 3B is a block diagram of the phase comparator 320 depicted in FIG. 3A according to an embodiment of the disclosure. Referring to FIG. 3A and FIG. 3B, the phase comparator 320 may include a phase detector 321 and a phase selector 322. The phase detector 321 detects a phase difference (e.g. phase skew) between the first clock signal CK and the second signal S12 based on the feedback signal FB generated by the multiplexer 330. If the rising edge of the second signal $S_{i2}$ lags the rising edge of the feedback signal FB, the phase detector 321 generates an up signal UP to the phase selector 422. On the other hand, if the rising edge of the second signal $S_{i2}$ leads the rising edge of the feedback signal FB, the phase detector 321 generates a down signal DN to the phase selector 322. Based on the up signal UP or the down signal DN, the phase selector 322 can generate the comparison signal CS to the multiplexer 330.

Figure 4:
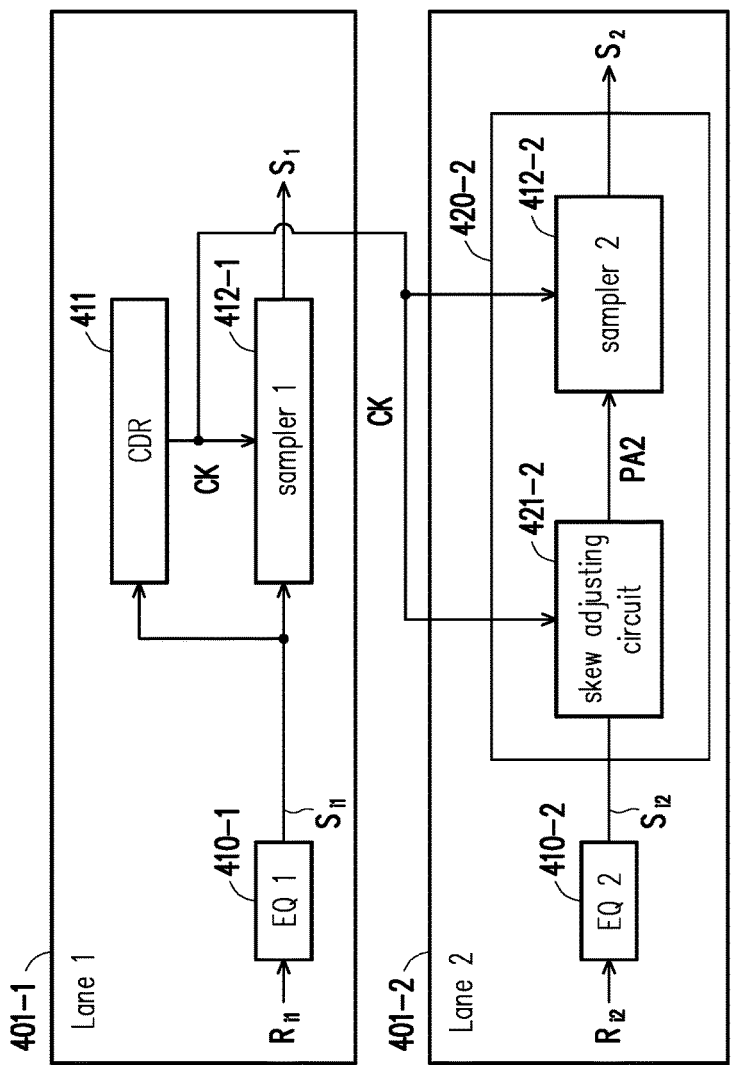
FIG. 4 is a block diagram of a signal receiving apparatus illustrating a data deskew operation according to an embodiment of the disclosure.

A data deskew operation performed in a signal receiving apparatus with two lanes architecture is also demonstrated below. FIG. 4 is a block diagram of a signal receiving apparatus 400 illustrating a data deskew operation according to an embodiment of the disclosure. In the embodiment of FIG. 4, the signal receiving apparatus 400 includes a first lane 401-1 and a second lane 401-2, wherein a deskew circuit 420-2 is disposed in the second lane 401-2 to perform the data deskew operation. It should be note that FIG. 4 is just an example to illustrate the data deskew operation performed in a two lanes architecture, the signal receiving apparatus 400 may also be applied to a multi-lane architecture to perform multiple data deskew operations for each of the signals received in different lanes.

Referring to FIG. 4, a first equalizer 410-1, a CDR circuit 411, and a first sampler 412-1 are disposed in the first lane 401-1. A second equalizer 410-2 and a deskew circuit 420-2 are disposed in the second lane 401-2. The first equalizer 410-1 and the second equalizer 410-2 may equalize the input signals $R_{i1}$ and $R_{i2}$ so as to generate the first signal $S_{i1}$ and the second signal $S_{i2}$. For example, the first equalizer 410-1 and the second equalizer 410-2 may shape waveforms of the input signals $R_{i1}$ and $R_{i2}$ to compensate for attenuation of high-frequency signal components. In some embodiments, each of the input signals $R_{i1}$ and $R_{i2}$ may include a pair of differential signals to reduce noise effects.

The CDR circuit 411 is coupled to the first sampler 412-1 and the deskew circuit 420-2. The CDR circuit 411 receives the first signal $S_{i1}$ from the first equalizer 410-1 and decodes the first signal $S_{i1}$ to extract the first clock signal CK from the first signal $S_{i1}$. When the CDR circuit 411 acquires the first clock signal CK, the CDR circuit 411 may provide the first clock signal CK to the first sampler 412-1 and the deskew circuit 420-2. The first sampler 412-1 also receives the first signal $S_{i1}$ from the first equalizer 410-1. The first sampler 412-1 utilizes the first clock signal CK to sample the first signal $S_{i1}$ so as to generate a first output signal $S_1$.

The deskew circuit 420-2 receives the second signal $S_{i2}$ from the second equalizer 410-2 and adjusts a phase skew between the first clock signal CK and the second signal $S_{i2}$ so as to generate a second output signal $S_2$. The deskew circuit 420-2 includes a skew adjusting circuit 421-2 and a second sampler 412-2 coupled to the skew adjusting circuit 421-2. The skew adjusting circuit 421-2 detects the phase skew based on the first clock signal CK to generate a phase adjusting signal PA2. The second sampler 412-2 generates the second output signal S2 according to the phase adjusting signal PA2.

Figure 5:
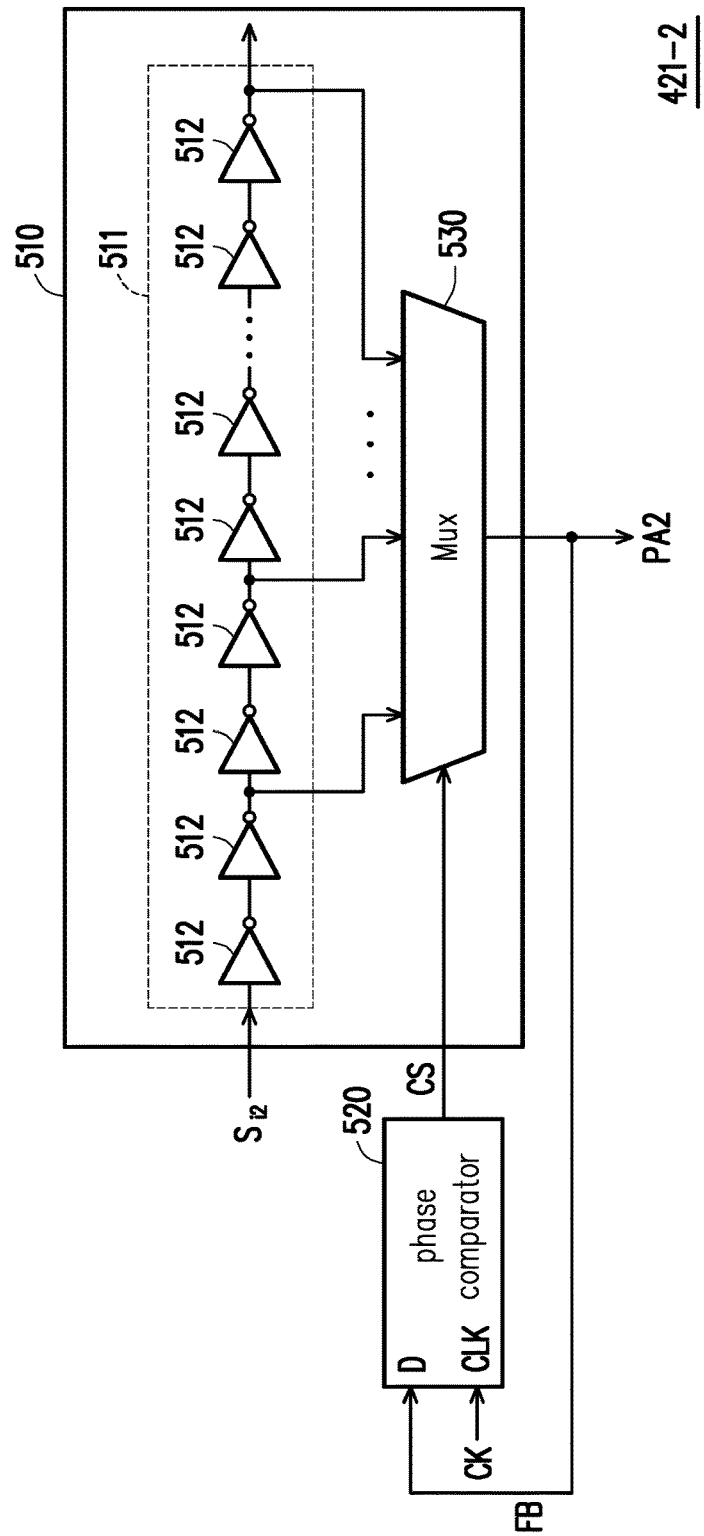
FIG. 5 is a block diagram of the skew adjusting circuit depicted in FIG. 4 according to an embodiment of the disclosure.

For example, FIG. 5 is a block diagram of the skew adjusting circuit 421-2 depicted in FIG. 4 according to an embodiment of the disclosure. As shown in FIG. 5, the skew adjusting circuit 421-2 includes a phase comparator 520 and a phase adjusting circuit 510. The phase adjusting circuit 510 includes a delay circuit 511 and a multiplexer (Mux) 530 coupled to the delay circuit 511. The delay circuit 511 may include a plurality of delay elements 512, which can be buffers, inverters, other delay elements, or any combination thereof. In this embodiment, the delay elements 512 includes a plurality of serially connected inverters.

When delay circuit 511 receives the second signal $S_{i2}$, the delay circuit 511 may generate a plurality of data delay signals according to the second signal $S_{i2}$. The multiplexer 530 may select one of the plurality of data delay signals as a feedback signal FB and transmit the feedback signal FB to the phase comparator 520. The phase comparator 520 generates a comparison signal CS according to the feedback signal FB and the first clock signal CK. When the multiplexer 530 receives the comparison signal CS, the multiplexer 530 generates a phase adjusting signal PA2 according to the comparison signal CS.

For example, the phase comparator 520 may compare the feedback signal FB and the first clock signal CK to generate a comparison result as the comparison signal CS. It is assumed that the comparison result shows a phase difference of 60 degrees between the first clock signal CK and the second signal $S_{i2}$. The multiplexer 530 may select one data delay signal with a phase of 60 degrees from the data delay signals generated by the delay circuit 511 as the phase adjusting signal PA2. Therefore, the second sampler 412-2 in FIG. 4 can utilizes the first clock signal CK and the phase adjusting signal PA2 to generate the second output signal $S_2$.

In another embodiment, the second sampler 412-2 may also receive the second signal $S_{i2}$ directly and perform an oversampling operation to sample the second signal $S_{i2}$ by several times. For example, the second sampler 412-2 may sample the second signal $S_{i2}$ by five times to generate five data signals with different phases. Then, the second sampler 412-2 may generate the second output signal $S_2$ based on the phase adjusting signal PA2 and one of the five data signals.

Figure 6A:
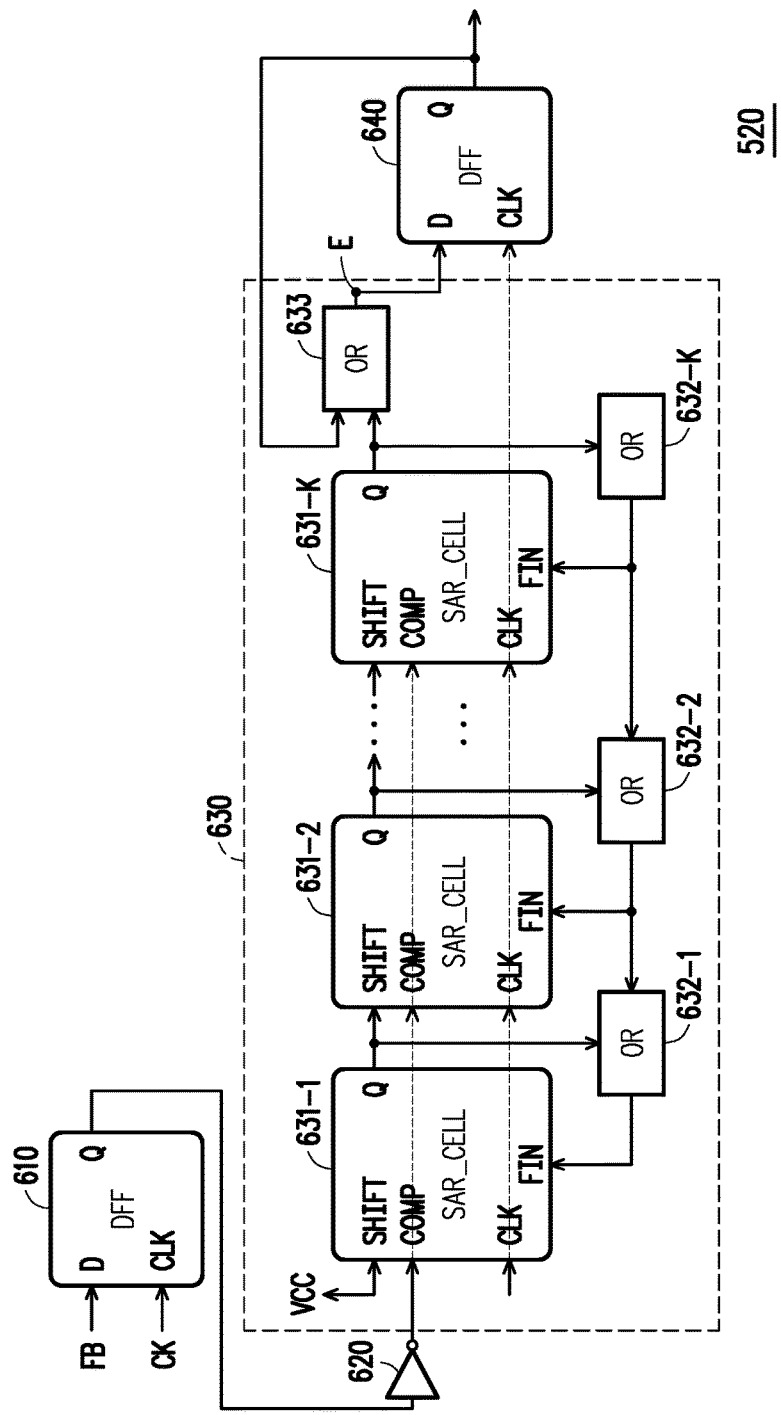
FIG. 6A is a block diagram of the phase comparator depicted in FIG. 5 according to an embodiment of the disclosure.

FIG. 6A is a block diagram of the phase comparator 520 depicted in FIG. 5 according to an embodiment of the disclosure. Referring to FIG. 6A, the phase comparator 520 includes a first flip-flop 610, an inverter 620, a comparison circuit 630, and a second flip-flop 640. Each of the first flip-flop 610 and the second flip-flop 640 may be a D-type flip-flop (DFF), which has a data input terminal D, a clock input terminal CLK, and an output terminal Q. The data input terminal D of the first flip-flop 610 receives the feedback signal FB provided by the multiplexer 630, and the clock input terminal CLK of the first flip-flop 610 receives the first clock signal CK.

An input terminal of the inverter 620 is coupled to the output terminal Q of the first flip-flop 610. A comparison terminal COMP of the comparison circuit 630 is coupled to an output terminal of the inverter 620. The data input terminal D of the second flip-flop 640 is coupled to an output terminal E of the comparison circuit 630. In this embodiment, the comparison circuit 630 may include a successive approximation register (SAR) logic circuit to perform a comparison operation. For example, the comparison circuit 630 may include a combination of a plurality of SAR cells 631-1, 631-2, . . . 631-K and a plurality of OR gates 633, 632-1, 632-2, . . . 632-K, wherein K is a positive integer. Each of the SAR cells 631-1~631-K includes a shift terminal SHIFT, a comparison terminal COMP, a clock input terminal CLK and an ending terminal FIN.

In the comparison process, the comparison circuit 630 in FIG. 6A may employ a binary search method to determine bits of a digital signal. For example, an 'M' bit digital signal generally requires 'M' clock cycles to determine the 'M' bits of the digital signal. The comparison circuit 630 first determines the most significant bit (MSB) of a digital signal outputted from the comparison circuit 630. A bit is set to '1' or reset to '0' in one of the plurality of SAR cells 631-1~631-K based on the delay amount between the feedback signal FB (e.g., the multiplexer 530 may provide the feedback signal FB) and the first clock signal CK. When the MSB of the digital signal is determined, the comparison circuit 630 progresses one bit at a time until the least significant bit (LSB) is resolved.

Figure 6B:
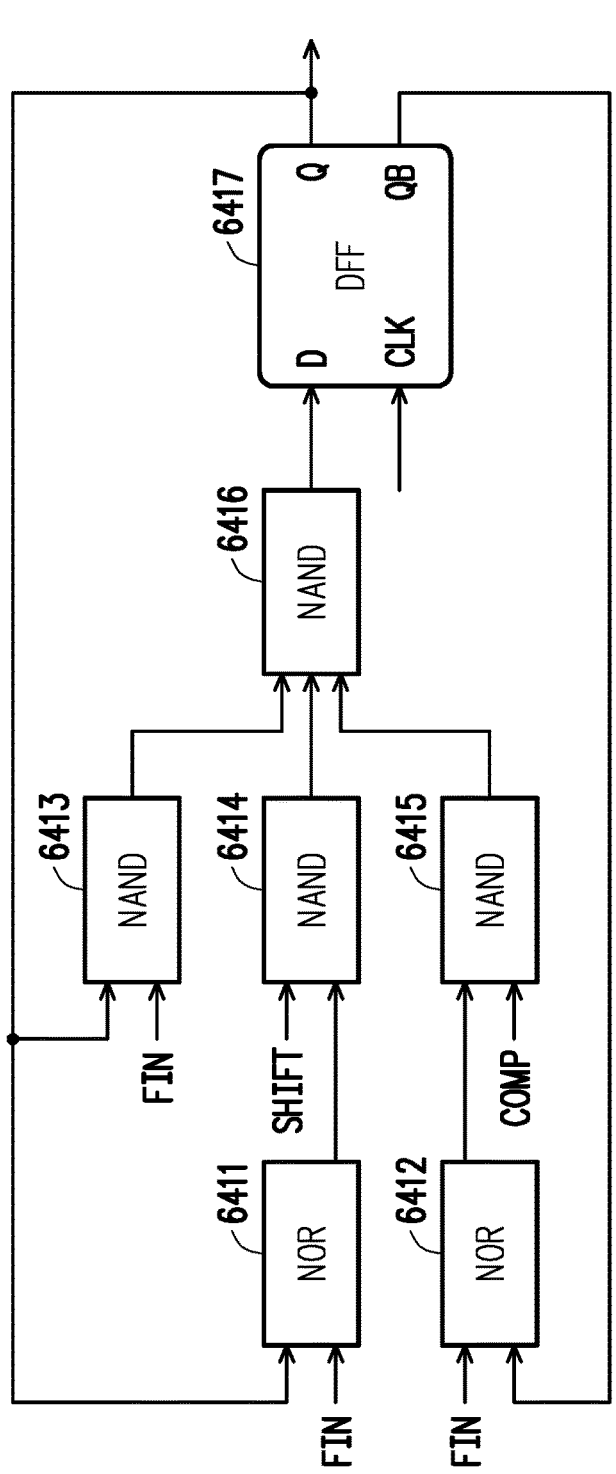
FIG. 6B is a block diagram illustrating the SAR cell depicted in FIG. 6A according to an embodiment of the disclosure.

FIG. 6B is a block diagram illustrating the SAR cell 631-1 depicted in FIG. 6A according to an embodiment of the disclosure. As shown in FIG. 6B, the circuit structure of the SAR cell 631-1 include NOR gates 6411~6412, NAND gates 6413~6416, and a D-type flip-flop 6417. A first input terminal of the NOR gate 6411 and a first input terminal of the NOR gate 6412 is coupled to the ending terminal FIN of the SAR cell 631-1, respectively. A second input terminal of the NOR gate 6411 is coupled to an output terminal Q of the D-type flip-flop 6417, and a second input terminal of the NOR gate 6412 is coupled to an inverted output terminal QB of the D-type flip-flop 6417.

A first input terminal of the NAND gate 6413 is coupled to the output terminal Q of the D-type flip-flop 6417, and a second input terminal of the NAND gate 6413 is s coupled to the ending terminal FIN of the SAR cell 631-1. A first input terminal of the NAND gate 6414 is coupled to the shift terminal SHIFT of the SAR cell 631-1, and a second input terminal of the NAND gate 6414 is coupled to an output terminal of the NOR gate 6411. A first input terminal of the NAND gate 6415 is coupled to an output terminal of the NOR gate 6412, and a second input terminal of the NAND gate 6415 is coupled to the comparison terminal COMP of the SAR cell 631-1. The input terminals of the NAND gate 6416 are coupled to the output terminals of the NAND gates 6413~6415, respectively. An output terminal of the NAND gate 6416 is coupled to the data input terminal D of the D-type flip-flop 6417.

While the circuit configuration shown in FIG. 6A is employed for a data deskew operation, it may also be applied to the phase comparator 320 depicted in FIG. 3A for a clock deskew operation. However, when performing the clock deskew operation, the data input terminal D of the first flip-flop 610 should receive the second signal $S_{i2}$, and the clock input terminal CLK of the first flip-flop 610 should receive the feedback signal FB provided by the multiplexer 330. Other operation details may be deduced from the data deskew operation discussed before, and therefore no description will be further provided hereinafter.

In a practical application, a signal receiving apparatus may be an independent unit, or may be integrated into various kinds of electronic devices such as televisions, computer monitors and projectors. For example, the signal receiving apparatus of the present disclosure may be applicable to a low voltage differential signaling (LVDS) interface or a mini-LVDS interface.

Figure 7:
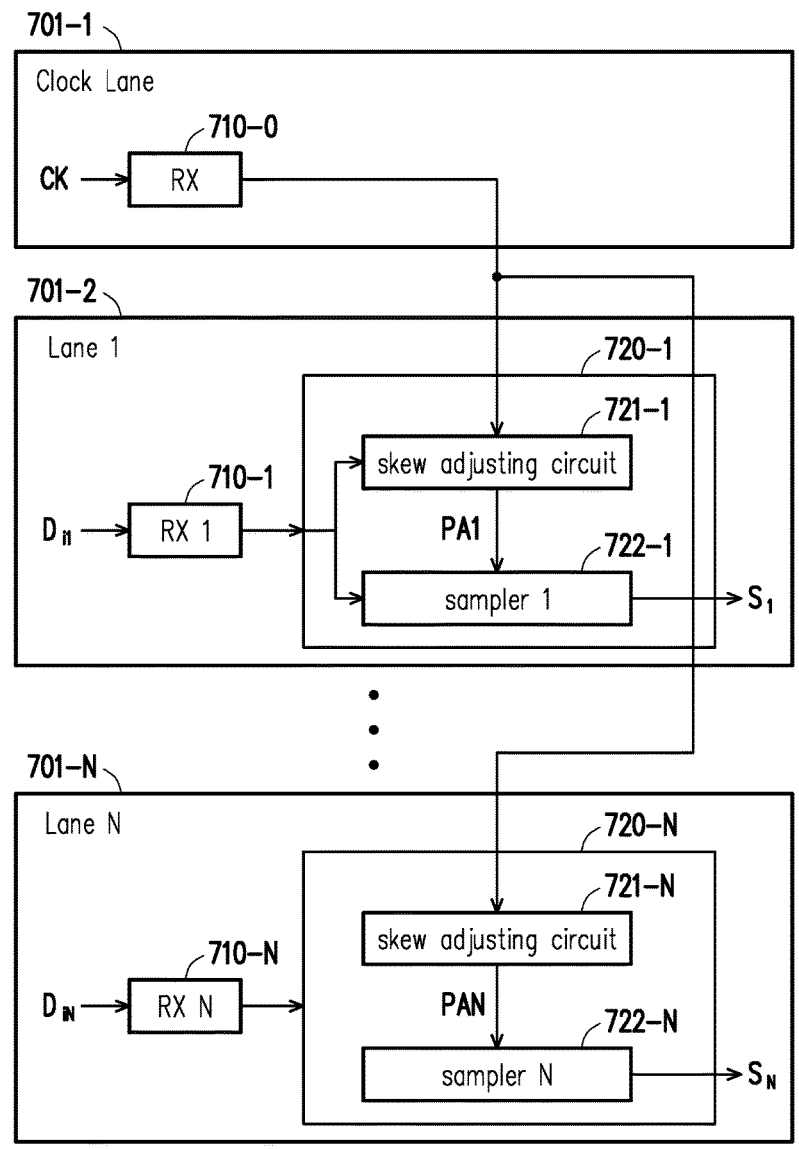
FIG. 7 is a block diagram of a signal receiving apparatus according to another embodiment of the disclosure

FIG. 7 is a block diagram of a signal receiving apparatus 700 according to another embodiment of the disclosure. Referring to FIG. 7, the signal receiving apparatus 700 may be a mini-LVDS receiving apparatus, which includes two types of lanes to receive different types of signals. For example, the signal receiving apparatus 700 includes a clock lane 701-1, and a receiver 710-0 is disposed in the clock lane 701-1 to receive a first clock signal CK. The signal receiving apparatus 700 also includes a plurality of lanes 701-2~701-N, and each of the lanes 701-2~701-N includes a receiver (e.g., each of the receivers 710-1~710-N) to receive data signal $D_{i1}$~$D_{iN}$, respectively.

In addition, each of the lanes 701-2~701-N further includes a deskew circuit (e.g., each of the deskew circuits 720-1~720-N). The receiver 710-0 provides the first clock signal CK to each of the deskew circuits 720-1~720-N, so that the deskew circuits 720-1~720-N may perform a deskew operation based on the first clock signal CK. For example, the deskew circuit 720-1 may adjust a phase skew between the first clock signal CK and the first data signal $D_{i1}$ so as to generate a first output signal $S_1$. The deskew circuit 720-1 includes a skew adjusting circuit 721-1 and a first sampler 722-1 coupled to the skew adjusting circuit 721-1. The skew adjusting circuit 721-1 detects the phase skew based on the first clock signal CK to generate a phase adjusting signal PA1 When the first sampler 722-1 receives the phase adjusting signal PA1, the first output signal $S_1$ can be generated by the first sampler 722-1 based on the phase adjusting signal PA1.

Similarly, the deskew circuit 720-N may adjust a phase skew between the first clock signal CK and the Nth data signal $D_{iN}$ so as to generate the Nth output signal $S_N$. The deskew circuit 720-N includes a skew adjusting circuit 721-N and the Nth sampler 722-N coupled to the skew adjusting circuit 721-N. The skew adjusting circuit 721-N detects the phase skew based on the first clock signal CK to generate a phase adjusting signal PAN. When the Nth sampler 722-N receives the phase adjusting signal PAN, the Nth output signal $S_N$ can be generated by the Nth sampler 722-N based on the phase adjusting signal PAN.

A detailed clock deskew operation or a data deskew operation performed by the deskew circuits 720-1~720-N shown in FIG. 7 may be deduced from the embodiments of FIG. 3 and FIG. 5.

Figure 8:
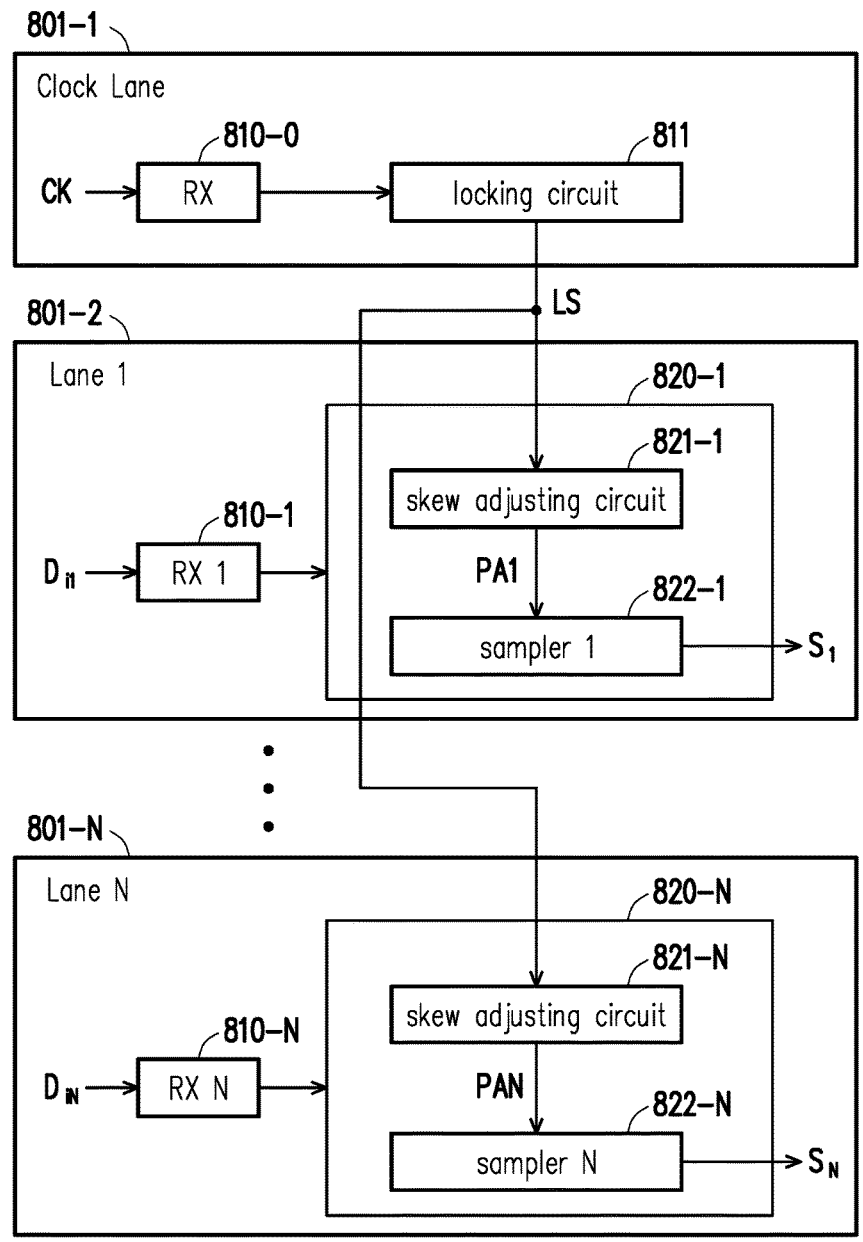
FIG. 8 is a block diagram of a signal receiving apparatus according to another embodiment of the disclosure.

FIG. 8 is a block diagram of a signal receiving apparatus 800 according to another embodiment of the disclosure. Referring to FIG. 8, the signal receiving apparatus 800 may be a LVDS receiving apparatus, which includes two types of lanes to receive different types of signals. For example, the signal receiving apparatus 800 includes a clock lane 801-1, and a receiver 810-0 is disposed in the clock lane 801-1 to receive a first clock signal CK. The signal receiving apparatus 800 also includes a plurality of lanes 801-2~801-N, and each of the lanes 801-2~801-N includes a receiver (e.g., each of the receivers 810-1~810-N) to receive data signal $D_{i1}$~$D_{iN}$, respectively.

In addition, the clock lane 801-1 further includes a locking circuit 811, and each of the lanes 801-2~801-N further includes a deskew circuit (e.g., each of the deskew circuits 820-1~820-N). The locking circuit 811 is coupled to the receiver 810-0 and each of the deskew circuits 820-1~820-N. The locking circuit 811 may be a phase locked loop (PLL) circuit or a delay locked loop (DLL) circuit, which generates a locking signal LS according to the first clock signal CK and provides the locking signal LS to the deskew circuits 820-1~820-N, respectively. Since the locking signal LS is synchronized with the first clock signal CK, each of the deskew circuits 820-1 820-N may perform a deskew operation based on the locking signal LS.

For example, the deskew circuit 820-1 may adjust a phase skew between the first clock signal CK and the first data signal $D_{i1}$ so as to generate a first output signal $S_1$. The deskew circuit 820-1 includes a skew adjusting circuit 821-1 and a first sampler 822-1 coupled to the skew adjusting circuit 821-1. The skew adjusting circuit 821-1 detects the phase skew based on the locking signal LS to generate a phase adjusting signal PA1. When the first sampler 822-1 receives the phase adjusting signal PA1, the first output signal $S_1$ can be generated by the first sampler 822-1 based on the phase adjusting signal PA1.

Similarly, the deskew circuit 820-N may adjust a phase skew between the first clock signal CK and the Nth data signal $D_{iN}$ so as to generate the Nth output signal $S_N$. The deskew circuit 820-N includes a skew adjusting circuit 821-N and the Nth sampler 822-N coupled to the skew adjusting circuit 821-N. The skew adjusting circuit 821-N detects the phase skew based on the first clock signal CK to generate a phase adjusting signal PAN. When the Nth sampler 822-N receives the phase adjusting signal PAN, the Nth output signal $S_N$ can be generated by the Nth sampler 822-N based on the phase adjusting signal PAN.

A detailed clock deskew operation or a data deskew operation performed by the deskew circuits 820-1~820-N shown in FIG. 8 may be deduced from the embodiments of FIG. 3 and FIG. 5.

In summary of the above, in the embodiments of the disclosure, the signal receiving apparatus includes a first lane and at least one second lane. At least one deskew circuit is disposed in the at least one second lane of the signal receiving apparatus. The deskew circuit uses a single clock signal acquired from the first lane of the signal receiving apparatus to eliminate the phase skew of an input signal received from the at least one second lane of the signal receiving apparatus. Hence, the signal receiving apparatus does not need to dispose multiple CDR circuit (e.g., one CDR circuit per lane). Therefore, the signal receiving apparatus of the disclosure can consume much lower power.

Although the disclosure has been disclosed by the above embodiments, they are not intended to limit the disclosure. It will be apparent to one of ordinary skill in the art that modifications and variations to the disclosure may be made without departing from the spirit and scope of the disclosure. Therefore, the scope of the disclosure will be defined by the appended claims.

What is claimed is:

1. A signal receiving apparatus, comprising:
   a clock and data recovery (CDR) circuit, receiving a first signal through a first lane of the signal receiving apparatus and decoding the first signal to extract a first clock signal from the first signal;
   a first sampler, receiving the first clock signal from the CDR circuit and receiving the first signal through the first lane of the signal receiving apparatus, wherein the first sampler samples the first signal according to the first clock signal so as to generate a first output signal;
   at least one deskew circuit, receiving the first clock signal from the CDR circuit and receiving a second signal through at least one second lane of the signal receiving apparatus, wherein the least one deskew circuit adjusts a phase skew between the first clock signal and the second signal so as to generate a second output signal, and the at least one deskew circuit comprises:
      a skew adjusting circuit, detecting the phase skew based on the first clock signal to generate a phase adjusting signal; and
      a second sampler, coupled to the skew adjusting circuit, generating the second output signal according to the phase adjusting signal.

2. The signal receiving apparatus according to claim 1, wherein the first signal and the second signal are equalized signals.

3. The signal receiving apparatus according to claim 1, wherein the skew adjusting circuit comprises:
   a phase comparator, generating a comparison signal according to a feedback signal and the second signal; and
   a phase adjusting circuit, coupled to the phase comparator to provide the feedback signal, wherein the phase adjusting circuit generates the phase adjusting signal according to the comparison signal.

4. The signal receiving apparatus according to claim 3, wherein the phase adjusting circuit comprises:
   a clock phase generator, including a plurality of inverters, generating a plurality of clock signals with different phases according to the first clock signal; and
   a multiplexer, coupled to the clock phase generator to select one of the plurality of clock signals as the feedback signal, wherein the multiplexer generates the phase adjusting signal according to the comparison signal.

5. The signal receiving apparatus according to claim 3, wherein the phase comparator comprises:
   a first flip-flop, having a data input terminal, a clock input terminal, and an output terminal, wherein the data input terminal of the first flip-flop receives the second signal, and the clock input terminal of the first flip-flop receives the feedback signal;
   an inverter, having an input terminal and an output terminal, wherein the input terminal of the inverter is coupled to the output terminal of the first flip-flop;
   a comparison circuit, having a comparison input terminal and an output terminal, wherein the comparison input terminal of the comparison circuit is coupled to the output terminal of the inverter; and
   a second flip-flop, wherein a data input terminal of the second flip-flop is coupled to the output terminal of the comparison circuit.

6. The signal receiving apparatus according to claim 5, wherein the comparison circuit includes a successive approximation register (SAR) logic circuit, and the SAR logic circuit includes a plurality of SAR cells.

7. The signal receiving apparatus according to claim 1, wherein the skew adjusting circuit comprises:
   a phase comparator, generating a comparison signal according to a feedback signal and the first clock signal; and
   a phase adjusting circuit, coupled to the phase comparator to provide the feedback signal, wherein the phase adjusting circuit generates the phase adjusting signal according to the comparison signal.

8. The signal receiving apparatus according to claim 7, wherein the phase adjusting circuit comprises:
   a delay circuit, generating a plurality of data delay signals according to the second signal; and
   a multiplexer, coupled to the delay circuit to select one of the plurality of data delay signals as the feedback signal, wherein the multiplexer generates the phase adjusting signal according to the comparison signal.

9. The signal receiving apparatus according to claim 7, wherein the phase comparator comprises:
   a first flip-flop, having a data input terminal, a clock input terminal and an output terminal, wherein the data input terminal of the first flip-flop receives the feedback signal, and the clock input terminal of the first flip-flop receives the first clock signal;
   an inverter, having an input terminal and an output terminal, wherein the input terminal of the inverter is coupled to the output terminal of the first flip-flop;
   a comparison circuit, having a comparison input terminal and an output terminal, wherein the comparison input terminal of the comparison circuit is coupled to the output terminal of the inverter; and
   a second flip-flop, wherein a data input terminal of the second flip-flop is coupled to the output terminal of the comparison circuit.

10. A signal receiving apparatus, comprising:
- a first receiver, receiving a first clock signal through a first lane of the signal receiving apparatus;
- at least one deskew circuit, receiving a first data signal through at least one second lane of the signal receiving apparatus and adjusting a phase skew between the first clock signal and the first data signal so as to generate a first output signal, wherein the at least one deskew circuit comprises:
    - a skew adjusting circuit, detecting the phase skew based on the first clock signal to generate a phase adjusting signal; and
    - a first sampler, coupled to the skew adjusting circuit, generating the first output signal according to the phase adjusting signal; and
- at least one second receiver, receiving the first data signal through the at least one second lane of the signal receiving apparatus and transmitting the first data signal to the at least one deskew circuit.

11. The signal receiving apparatus according to claim 10, further comprising:
- a locking circuit, coupled to the first receiver and the at least one deskew circuit, wherein the locking circuit generates a locking signal according to the first clock signal and provides the locking signal to the at least one deskew circuit, wherein the locking signal is synchronized with the first clock signal.

12. The signal receiving apparatus according to claim 11, wherein the locking circuit includes a phase locked loop (PLL) circuit or a delay locked loop (DLL) circuit.

* * * * *